(12) United States Patent
Yu et al.

(10) Patent No.: US 11,764,417 B2
(45) Date of Patent: Sep. 19, 2023

(54) DEVICE FOR AUTOMATICALLY DISMANTLING POWER BATTERY MODULE

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Jindong Wu, Foshan (CN); Benben Wu, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/042,206

(22) PCT Filed: May 13, 2021

(86) PCT No.: PCT/CN2021/093663
§ 371 (c)(1),
(2) Date: Feb. 17, 2023

(87) PCT Pub. No.: WO2022/037140
PCT Pub. Date: Feb. 24, 2022

(65) Prior Publication Data
US 2023/0231215 A1 Jul. 20, 2023

(30) Foreign Application Priority Data
Aug. 17, 2020 (CN) .......................... 202010824157.1

(51) Int. Cl.
*H01M 6/00* (2006.01)
*H01M 10/54* (2006.01)
(Continued)

(52) U.S. Cl.
CPC ............... *H01M 10/54* (2013.01); *B09B 3/35* (2022.01); *B09B 2101/16* (2022.01)

(58) Field of Classification Search
CPC ...... H01M 6/52; H01M 6/5022; H01M 10/04; H01M 10/42; C22B 7/001; C22B 15/006;
(Continued)

(56) References Cited

FOREIGN PATENT DOCUMENTS

| CN | 106159369 A | 11/2016 |
|---|---|---|
| CN | 109672003 A | 4/2019 |

(Continued)

OTHER PUBLICATIONS

International Search Report and Written Opinion in PCT/CN2021/093663 dated Aug. 13, 2021.
(Continued)

*Primary Examiner* — Cynthia H Kelly
*Assistant Examiner* — Monique M Wills
(74) *Attorney, Agent, or Firm* — Buchalter; Jason W. Croft

(57) ABSTRACT

Disclosed is a device for automatically dismantling a power battery module, including a cutting platform, a clamping mechanism, a first cutting mechanism, a second cutting mechanism, a turnover mechanism, and a stripping mechanism. The clamping mechanism is disposed on the cutting platform. The first cutting mechanism includes a first cutting blade, a cutting blade set, and a first drive assembly. The second cutting mechanism includes a third cutting blade, a fourth cutting blade, and a third drive assembly. The first cutting blade, the cutting blade set, the third cutting blade, and the fourth cutting blade are vertically movable. The
(Continued)

cutting blade set includes a plurality of second cutting blades that are movable relative to each other.

8 Claims, 11 Drawing Sheets

(51) Int. Cl.
*B09B 3/35* (2022.01)
*B09B 101/16* (2022.01)

(58) Field of Classification Search
CPC ......... C22B 23/022; C22B 9/10; C22B 23/06; C22B 5/02; C22B 15/0052
See application file for complete search history.

(56) References Cited

FOREIGN PATENT DOCUMENTS

| | | | |
|---|---|---|---|
| CN | 110581324 A | 12/2019 | |
| CN | 111146524 A | 5/2020 | |
| CN | 110581324 B | * 11/2020 | ............ H01M 10/54 |
| CN | 111969271 A | 11/2020 | |
| CN | 212571114 U | 2/2021 | |
| HU | 580989 A | 11/1989 | |
| HU | 200862 B | 8/1990 | |
| KR | 20130070240 A | 6/2013 | |
| WO | 2022037140 A1 | 2/2022 | |

OTHER PUBLICATIONS

Novelty Search Report in Hungarian Application No. HU2200182A1 dated Jul. 26, 2022.

* cited by examiner

DEVICE FOR AUTOMATICALLY DISMANTLING POWER BATTERY MODULE

CROSS-REFERENCE TO RELATED APPLICATION

This application is a national stage filing under 35 U.S.C. § 371 of international application number PCT/CN2021/093663, filed May 13, 2021, which claims priority to Chinese patent application No. 202010824157.1 filed Aug. 17, 2020. The contents of these applications are incorporated herein by reference in their entirety.

TECHNICAL FIELD

The present disclosure relates to the technical field of power battery equipment, and in particular, to a device for automatically dismantling a power battery module.

BACKGROUND

Driven by the new energy vehicle industry, lithium-ion power batteries are widely applied. In 2018, the cumulative production and sales of new energy vehicles are respectively 1,270,500 and 1,256,200, growing by 59.92% and 61.74% respectively year on year. The service life of a power battery is usually 500 to 2000 cycles. After 5 to 8 years of use, the battery capacity is usually less than 80%, and the battery needs to be discarded when a travel requirement of a user cannot be satisfied. It is predicted that by the year 2020 scrapped power batteries will reach 248,000 tons, and the recycling problem of power batteries is very serious.

The recycling procedure of power batteries includes battery dismantling and material regeneration. The battery dismantling includes battery pack dismantling, battery module dismantling, and battery cell dismantling. A power battery module is formed by arranging a plurality of battery cells side by side in series and in parallel and wrapping the battery cells with a housing. In conventional dismantling of power batteries, a cutter is manually held to cut open a housing, and then the housing is knocked open with a stick to separate battery cells from the housing. The conventional dismantling manner has high potential safety hazards because the cutter is held in hand, and people are highly prone to injury. In addition, it is not easy to manually control the depth of cutting, and the battery cells are very likely to be damaged from cutting to cause severe battery inflammation and blasting. A large number of burrs are generated at cutting positions after the housing is cut and tend to cause physical injury. The dismantling manner is clearly restricted. Furthermore, an existing cutting device cannot cut power batteries of different sizes.

SUMMARY

The present disclosure is to at least resolve one of technical problems in the existing technology. In view of this, the present disclosure provides a device for automatically dismantling a power battery module, which dismantles a power battery automatically and can cut power batteries of different sizes.

An device for automatically dismantling a power battery module according to an embodiment of a first aspect of the present disclosure includes a cutting platform, a clamping mechanism, a first cutting mechanism, a second cutting mechanism, a turnover mechanism, and a stripping mechanism. The clamping mechanism is configured to clamp two sides of a power battery module to move the power battery module on the cutting platform. The first cutting mechanism is disposed on the cutting platform. The first cutting mechanism includes a first cutting blade, a cutting blade set, and a first drive assembly. The cutting blade set and the first cutting blade are disposed vertically at an interval. The cutting blade set includes a plurality of second cutting blades movable relative to each other and a second drive assembly configured to drive the second cutting blades to move and rotate. The first drive assembly is configured to drive the first cutting blade and the second cutting blades to move vertically. The second cutting mechanism is disposed on the cutting platform. The second cutting mechanism includes a third cutting blade, a fourth cutting blade, and a third drive assembly. The fourth cutting blade and the third cutting blade are disposed vertically at an interval. The third drive assembly is configured to drive the third cutting blade and the fourth cutting blade to move vertically. The turnover mechanism is disposed between the first cutting mechanism and the second cutting mechanism. The turnover mechanism is configured to horizontally turn over the power battery module. The stripping mechanism is disposed at an outlet end of the cutting platform. The stripping mechanism is configured to strip a housing of the power battery module.

The device for automatically dismantling the power battery module according to the embodiment of the present disclosure at least has the following technical effects. The power battery module is clamped by the clamping mechanism to perform annular cutting, and then the housing of the power battery module is removed by the stripping mechanism. Such a structure implements automatic dismantling of the power battery module, thus preventing burrs generated when the power battery module is manually cut from injuring a human body. The first cutting blade, the cutting blade set, the third cutting blade, and the fourth cutting blade are vertically movable. The cutting blade set is provided with the plurality of second cutting blades that move relative to each other, so that power battery modules of different models and with different quantities of cells can be dismantled.

According to some embodiments of the present disclosure, the second drive assembly includes a plurality of connecting frames hinged to each other, a plurality of bearings, a plurality of mounting bases, a first shaft, a first drive device, and a second drive device. The connecting frames include a plurality of connecting rods hinged to each other in the middle. Each connecting rod is connected to a toggle stand. Each bearing is mounted on the toggle stand. Each mounting base is mounted on the bearing. Each second cutting blade is mounted on the mounting base. The mounting base is provided with a through hole matching the first shaft in shape. The first shaft is slidably connected to the through hole. The second drive device drives the first shaft to rotate to enable the first shaft to drive the mounting bases to rotate. The first drive device is connected to the connecting frames.

According to some embodiments of the present disclosure, the clamping mechanism includes support frames disposed on a front side and a rear side of the cutting platform and a plurality of handle assemblies. The handle assemblies are movably disposed on the support frames and are oppositely arranged on the front side and the rear side of the cutting platform. Each handle assembly includes a push rod and a third drive device connected to the push rod. The third drive device is configured to drive the push rod to move longitudinally.

According to some embodiments of the present disclosure, each support frame is provided with a guide groove in the form of an annular track. The handle assembly further includes a first slide block, a gear, and a fourth drive device. The first slide block is connected to the third drive device. The first slide block moves along the guide groove. The fourth drive device is connected to the first slide block. The gear is mounted on the fourth drive device. The support frame is provided with a rack fitting the gear.

According to some embodiments of the present disclosure, the first cutting mechanism further includes a fifth drive device and a second shaft connected to the fifth drive device. The first cutting blade is mounted on the second shaft. The second cutting mechanism further includes a sixth drive device, a seventh drive device, a third shaft connected to the sixth drive device, and a fourth shaft connected to the seventh drive device. The third cutting blade is mounted on the third shaft. The fourth cutting blade is mounted on the fourth shaft. The first drive assembly includes two first grooves and two first cylinders. The first grooves are provided in the support frame at positions corresponding to the first shaft and the second shaft, respectively. The first cylinders are respectively connected to the first shaft and the second shaft. The second drive assembly includes two second grooves and two second cylinders. The second grooves are provided in the support frame at positions corresponding to the third shaft and the fourth shaft, respectively. The second cylinders are respectively connected to the third shaft and the fourth shaft.

According to some embodiments of the present disclosure, the turnover mechanism includes a plurality of turnover vanes, a fifth shaft, and an eighth drive device configured to drive the fifth shaft to rotate. The turnover vanes are mounted on the fifth shaft. The fifth shaft is connected to the eighth drive device.

According to some embodiments of the present disclosure, the stripping mechanism includes a first conveying mechanism and a plurality of gripping mechanisms. The plurality of gripping mechanisms are oppositely disposed on a front side and a rear side of the first conveying mechanism. Each gripping mechanism includes a ninth drive device, a gripping rod, a slide rail, a gripping slide block, and a tenth drive device. The gripping rod is connected to the ninth drive device. The slide rail is mounted on the gripping rod. The gripping slide block is movably disposed on the slide rail. The gripping slide block is connected to the tenth drive device. The ninth drive device is configured to drive the gripping rod to move longitudinally. The tenth drive device is configured to drive the gripping slide block to move along the slide rail.

According to some embodiments of the present disclosure, the tenth drive device includes a rotary motor, a rotating disk, and two rotating rods. The rotary motor is mounted on the gripping rod. The rotating disk is connected to the rotary motor. The rotating rods are respectively connected to the gripping slide block and the rotating disk.

According to some embodiments of the present disclosure, the device further includes a position device. The position device includes a reverse platform, a second slide block, and a third cylinder. The reverse platform is hinged to an outlet end of the first conveying mechanism. The second cylinders are hinged to the second slide block. A slide groove matching the second slide block is provided in a bottom of the reverse platform. The second slide block is slidably connected to the slide groove. A correction baffle is provided on an upper end surface of the reverse platform.

According to some embodiments of the present disclosure, the device further includes a sorting device. The sorting device includes a second conveying mechanism, a sorting baffle, a first pushing mechanism, and a second pushing mechanism. The second conveying mechanism is disposed at an outlet end of the position device. The sorting baffle is hinged to the second conveying mechanism. The first pushing mechanism and the second pushing mechanism are disposed on the right of the sorting baffle. The first pushing mechanism and the second pushing mechanism are respectively disposed on a front side and a rear side of the second conveying mechanism. The sorting baffle is provided with a plurality of blocking teeth. The first pushing mechanism is provided with a fourth cylinder and a first pushing plate. The second pushing mechanism is provided with a fifth cylinder and a second pushing plate.

The additional aspects and advantages of the present disclosure are partially provided in the following description and partially become obvious from the following description or understood through the practice of the present disclosure.

BRIEF DESCRIPTION OF DRAWINGS

The additional aspects and advantages of the present disclosure will be apparent and easily comprehensible from the description of the embodiments with reference to the accompanying drawings, in which.

Figure 1:
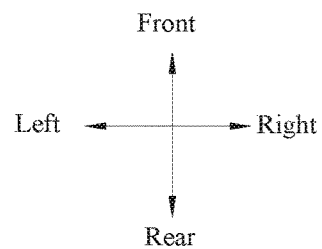
FIG. 1 is a schematic structural top view of a device for automatically dismantling a power battery module according to an embodiment of the present disclosure.
Figure 1:
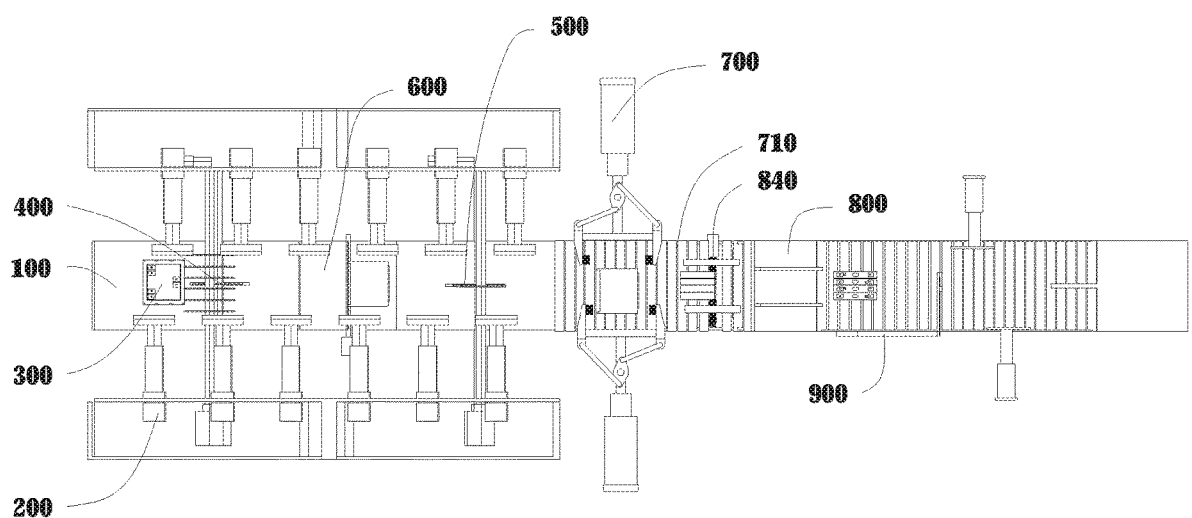

Reference numerals: cutting platform 100, transport device 110, conveyor belt 111, lifting device 112, vertical slide plate 113, lifting plate 114, fifth cylinder 115, battery baffle 116, limit plate 117, sixth cylinder 118, clamping mechanism 200, support frame 210, guide groove 211, handle assembly 220, push rod 221, friction pad 2211, third drive device 222, first slide block 223, power battery module 300, first cutting mechanism 400, first cutting blade 410, second cutting blade 411, second drive assembly 412, connecting frame 4121, bearing 4122, mounting base 4123, first shaft 4124, first drive device 4125, second drive device 4126, connecting rod 4127, toggle stand 4128, through hole 4129, cutting blade set 420, first drive assembly 430, first groove 431, first cylinder 432, fifth drive device 440, second shaft 450, second groove 460, second cylinder 470, second cutting mechanism 500, third cutting blade 510, fourth cutting blade 520, third drive assembly 530, sixth drive device 540, seventh drive device 550, third shaft 560, fourth shaft 570, turnover mechanism 600, turnover vane 610, fifth shaft 620, eighth drive device 630, stripping mechanism 700, first conveying mechanism 710, gripping mechanism 720, ninth drive device 721, gripping rod 722, slide rail 723, gripping slide block 724, elastic nail 7241, tenth drive device 725, rotary motor 7251, rotating disk 7252, rotating rod 7253, position device 800, reverse platform 810, slide groove 811, correction baffle 812, second slide block 820, third cylinder 830, blocking baffle 840, slide post 850, double screw 860, sorting device 900, second conveying mechanism 910, sorting baffle 920, blocking teeth 921, first pushing mechanism 930, fourth cylinder 931, first pushing plate 932, second pushing mechanism 940, fifth cylinder 941, and second pushing plate 942.

DETAILED DESCRIPTION

Embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain the present disclosure but should not be construed as a limitation to the present disclosure.

In the description of the present disclosure, "several" means one or more, "a plurality of" means more, "greater than a number", "less than a number", "exceed a number", and the like indicate that the number is excluded, and "above a number", "below a number", "within a number", and the like indicate that the number is included. It needs to be noted that regarding the description of orientations, orientation or location relationships indicated by terms such as "up", "down", "front", "rear", "left", "right", and "middle" are orientation or location relationships shown based on the accompanying drawings. The orientation or location relationships are only used to facilitate description of the present disclosure and simplify description, but are not used to indicate or imply that devices or elements must have specific orientations or are constructed and operated by using specific orientations, and therefore, cannot be understood as a limit to the present disclosure.

In the description of the present disclosure, unless otherwise expressly defined, the terms such as "mounted", and "connected" should be understood in a broad sense. For those having ordinary skill in the art, specific meanings of the terms in the present disclosure may be appropriately determined with reference to the specific content in the technical solution.

Referring to FIG. 1, FIG. 2, FIG. 3, and FIG. 4, a device for automatically dismantling a power battery module according to an embodiment of the present disclosure is configured to dismantle a power battery module. A power battery module 300 is formed by arranging a plurality of battery cells side by side in series and in parallel and wrapping the battery cells with a housing. During dismantling, an electrode connection module of the power battery module is disposed facing upward. Annular cutting is performed on the housing of the power battery module. The electrode connection module located on the power battery module 300 is cut, and then a stripping mechanism 700 removes the housing of the power battery module. The device for automatically dismantling a power battery module includes a cutting platform 100, a clamping mechanism 200, a first cutting mechanism 400, a second cutting mechanism 500, a turnover mechanism 600, and the stripping mechanism 700. The clamping mechanism 200 is configured to clamp two sides of the power battery module 300 to move the power battery module 300 on the cutting platform 100. The first cutting mechanism 400 is disposed on the cutting platform 100. The first cutting mechanism 400 includes a first cutting blade 410, a cutting blade set 420, and a first drive assembly 430. The cutting blade set 420 and the first cutting blade 410 are disposed vertically at an interval. The cutting blade set 420 includes a plurality of second cutting blades 411 movable relative to each other and a second drive assembly 412 configured to drive the second cutting blades 411 to move and rotate. The first drive assembly 430 is configured to drive the first cutting blade 410 and the second cutting blades 411 to move vertically. The second cutting mechanism 500 is disposed on the cutting platform 100. The second cutting mechanism 500 includes a third cutting blade 510, a fourth cutting blade 520, and a third drive assembly 530. The fourth cutting blade 520 and the third cutting blade 510 are disposed vertically at an interval. The third drive assembly 530 is configured to drive the third cutting blade 510 and the fourth cutting blade 520 to move vertically. The turnover mechanism 600, the first cutting mechanism 400, and the second cutting mechanism 500 are disposed on the cutting platform 100 at intervals in a transverse direction. The turnover mechanism 600 is disposed between the first cutting mechanism 400 and the second cutting mechanism 500. The turnover mechanism 600 is configured to horizontally turn over the power battery module 300. The stripping mechanism 700 is disposed at an outlet end of the cutting platform 100 and is configured to strip the housing of the power battery module 300.

Figure 5:
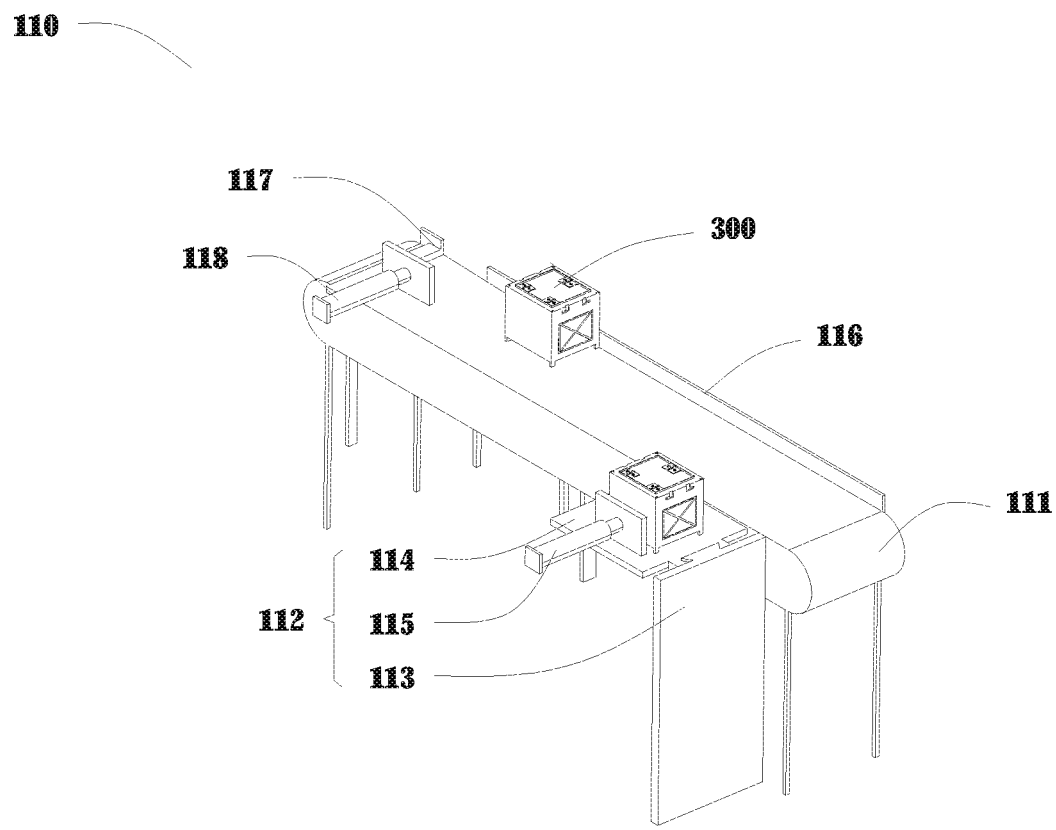
FIG. 5 is a schematic structural diagram of a transport device.

A working process is as follows. The power battery module 300 is placed on the cutting platform 100. The clamping mechanism 200 clamps a front side and a rear side of the power battery module 300. In this case, according to a size of the power battery module 300 and a quantity of cell batteries, the first drive assembly 430, the second drive assembly 412, and the third drive assembly 530 are activated. Heights of the first cutting blade 410, the second cutting blades 411, the third cutting blade 510, and the fourth cutting blade 520 are adjusted. A spacing between every two second cutting blades 411 is adjusted. After the adjustment is completed, the cutting blades are rotated by means of a motor or a rotary cylinder. The clamping mechanism 200 clamps the power battery module 300 to move rightward to be cut by the first cutting mechanism 400. After the cutting is completed, the electrode connection module on an upper end surface and a lower end surface of the power battery module 300 have been cut. The clamping mechanism 200 then clamps the power battery module 300 onto the turnover mechanism 600. In this case, the clamping mechanism 200 releases the power battery module 300, and power battery module 300 turns rightward by 90° by the turnover mechanism 600. The clamping mechanism 200 then clamps the power battery module 300 to be cut by the second cutting mechanism 500. After the cutting is completed, a left end surface and a right end surface of the power battery module 300 have been cut. In this case, the power battery module 300 has been annularly cut. The clamping mechanism 200 then clamps the power battery module 300 onto the stripping mechanism 700 which strips the cut housing. Specifically, the first cutting blade 410 is rotatably disposed on the cutting platform 100. The cutting blade set 420 is disposed above the first cutting blade 410. The third cutting blade 510 is rotatably disposed on the cutting platform 100. The fourth cutting blade 520 is rotatably disposed above the third cutting blade 510. The stripping mechanism 700 clamps a left side surface and a right side surface of the power battery module 300 to remove the housing from the power battery cells. For the stripping mechanism 700, reference may be made to an existing stripping mechanism which features clamping and removing. For the clamping mechanism 200, reference may be made to an existing clamping mechanism clamping the two side surfaces of the power battery module 300. For example, two cylinders and two inverted-"H"-shaped clamping blocks cooperate with a slide rail and a slide block, or two cylinders and two suction cups cooperate with a slide rail and a slide block. For the turnover mechanism 600, reference may be made to an existing turnover mechanism that can implement horizontal turnover. For example, a rectangular vane cooperates with the rotary cylinder, with a suction cup mounted on the vane. During use, the power battery module 300 is placed at the vane in parallel to a horizontal plane. The suction cup is tightly sucked on the power battery module 300. The rotary cylinder drives the vane to rotate by 90°, and then the suction cup is released. The first drive assembly 430 and the third drive assembly 530 may include a slide block, a slide rail, and a cylinder. The slide block is connected to the cylinder. The first cutting blade 410, the third cutting blade 510, and the fourth cutting blade 520 are respectively mounted on a shaft. The slide block is connected to the shaft. The cylinder drives the slide block to move along the slide rail. The device for automatically dismantling a power battery module according to the embodiment of the present disclosure clamps the power battery module 300 by the clamping mechanism 200 to perform annular cutting. The stripping mechanism 700 then removes the housing of the power battery module 300. Such a structure implements automatic dismantling of the power battery module 300, preventing burrs generated when the power battery module 300 is manually cut from injuring a human body. The first cutting blade 410, the cutting blade set 420, the third cutting blade 510, and the fourth cutting blade 520 are vertically movable. The cutting blade set 420 is provided with the plurality of second cutting blades 411 that move relative to each other, so that power battery modules 300 of different models and with different quantities of cells can be dismantled. As shown in FIG. 5, the device further includes a transport device 110. The transport device 110 includes a conveyor belt 111. The conveyor belt 111 and the cutting platform 100 are disposed at a right angle. A lifting device 112 is provided on a side of the conveyor belt 111. The lifting device 112 includes a vertical slide plate 113 and a lifting plate 114. The lifting plate 114 moves vertically along the vertical slide plate 113. The vertical slide plate 113 is provided with a fifth cylinder 115 configured to push the power battery module 300 onto the conveyor belt 111. The conveyor belt 111 is provided with a battery baffle 116 and a limit plate 117. The battery baffle 116 is disposed at a position corresponding to the fifth cylinder 115. The limit plate 117 is disposed at a position corresponding to an inlet end of the cutting platform 100. A sixth cylinder 118 is provided on a side of the limit plate 117.

Figure 2:
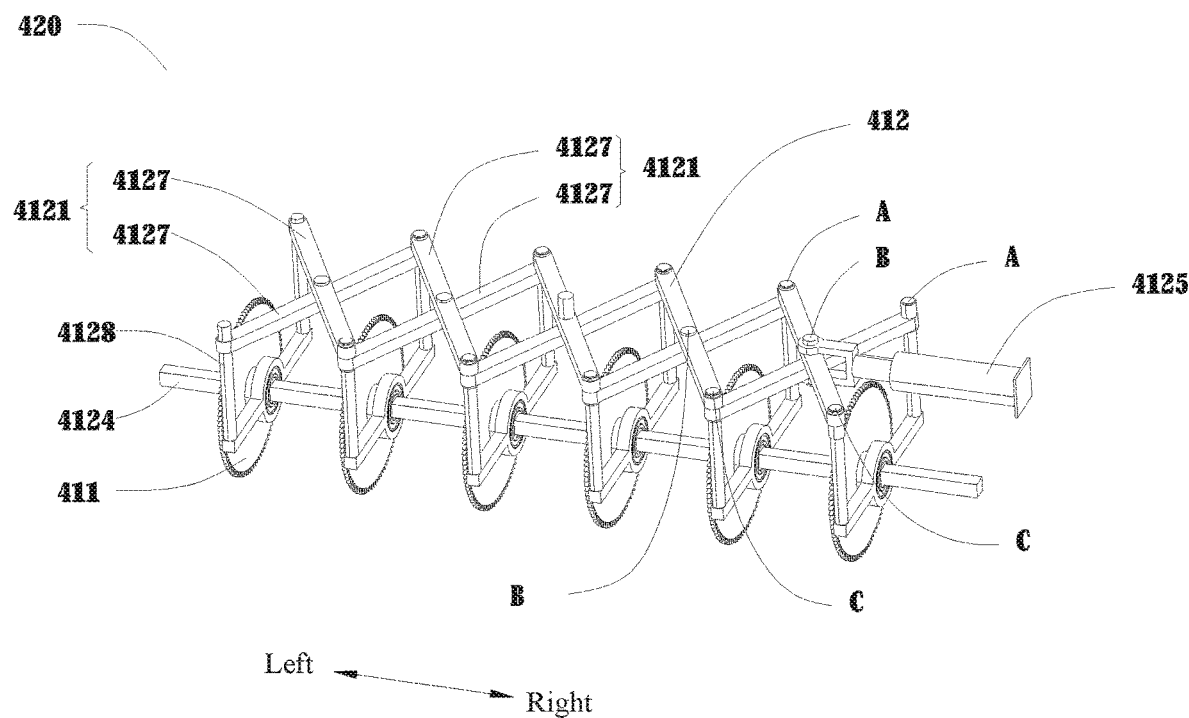
FIG. 2 is a schematic structural diagram of a cutting blade set.
Figure 6:
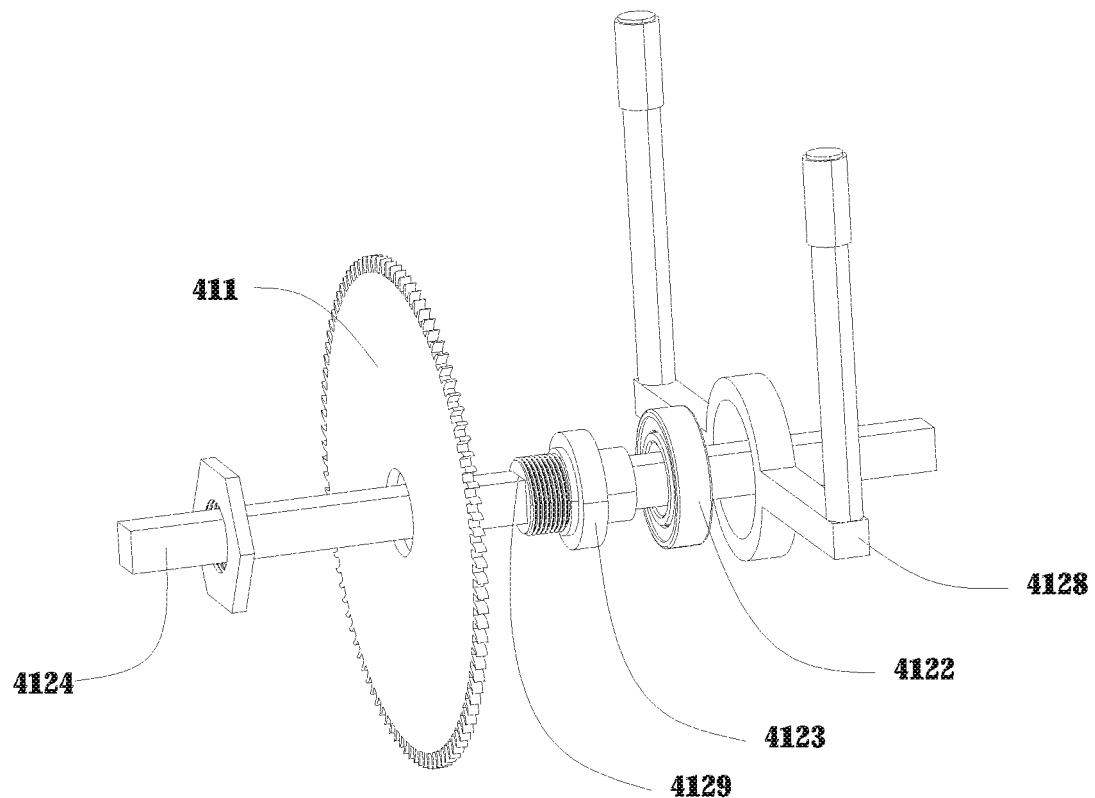
FIG. 6 is a schematic structural diagram of a second drive assembly.

In some embodiments of the present disclosure, as shown in FIG. 2 and FIG. 6, the second drive assembly 412 includes a plurality of connecting frames 4121 hinged to each other, a plurality of bearings 4122, a plurality of mounting bases 4123, a first shaft 4124, a first drive device 4125, and a second drive device 4126. The connecting frames 4121 include a plurality of connecting rods 4127 hinged to each other in the middle. Each connecting rod 4127 is connected to a toggle stand 4128. Each bearing 4122 is mounted on the toggle stand 4128. Each mounting base 4123 is mounted on the bearing 4122. Each second cutting blade 411 is mounted on the mounting base 4123. The mounting base 4123 is provided with a through hole 4129 matching the first shaft 4124 in shape. The first shaft 4124 is slidably connected to the through hole 4129. The second drive device 4126 drives the first shaft 4124 to rotate to enable the first shaft 4124 to drive the mounting bases 4123 to rotate. The first drive device 4125 is connected to the connecting frames 4121. Specifically, the first drive device 4125 is mounted on the rightmost connecting frame 4121. It may be conceived that, the first shaft 4124 may have a circular, square, rectangular or polygonal shape. The through hole 4129 corresponds to the first shaft 4124 in shape. Specifically, the connecting rod 4127 includes an endpoint A, an endpoint B, and an endpoint C. The endpoint A and the endpoint C are respectively located at two ends of the connecting rod 4127. The endpoint B is located in the middle of the connecting rod 4127. Endpoints B of two connecting rods 4127 are hinged to each other to form an "X"-shaped connecting frame 4121. The endpoint A and the endpoint C of the connecting rod 4127 are connected to the toggle stand 4128. When two connecting frames 4121 are hinged, for example, the left endpoint A and endpoint C of a connecting frame 4121 on the right and the right endpoint A and endpoint C of a connecting frame 4121 on the left are hinged, a retractable mesh-form structure is formed. During the adjustment of intervals between the plurality of second cutting blades 411, the first drive device 4125 drives the connecting frames 4121 to move leftward or rightward. Because the plurality of connecting frames 4121 hinged to each other form a mesh that is transversely retractable and the through hole 4129 slidably fits the first shaft 4124, when the first drive device 4125 drives the connecting frames 4121 to move leftward, the spacing between every two second cutting blades 411 is reduced, to enable the plurality of second cutting blades 411 to synchronously reduce the spacings. When the first drive device 4125 drives the connecting frames 4121 to move rightward, spacings between the plurality of second cutting blades 411 are synchronously increased. When there is a need to rotate the second cutting blades 411, the second drive device 4126 is activated to drive the first shaft 4124 to rotate. Because there is a friction force between the first shaft 4124 and the through hole 4129 to drive the second cutting blades 411 to rotate, if the first shaft 4124 has a polygonal shape, for example, a square shape, the square first shaft 4124 cooperates with the square through hole 4129 to implement guidance and stable transmission. Specifically, the first drive device 4125 is a cylinder. The second drive device 4126 may be a rotary cylinder and a motor. Such a structure is used to cut the electrode connection module on the upper surface of battery modules of different sizes, and the adjustment is convenient and simple.

Figure 7:
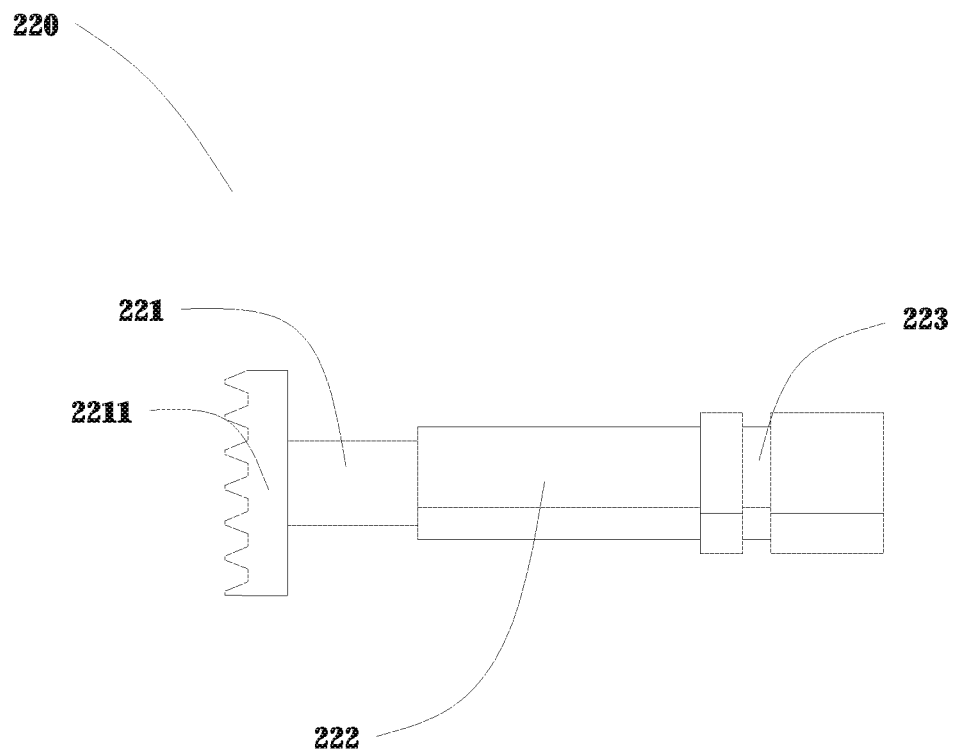
FIG. 7 is a schematic structural top view of a handle assembly.

In some embodiments of the present disclosure, as shown in FIG. 1 and FIG. 7, the clamping mechanism 200 includes support frames 210 disposed on a front side and a rear side of the cutting platform 100 and a plurality of handle assemblies 220. The handle assemblies 220 are movably disposed on the support frames 210 and are oppositely arranged on the front side and the rear side of the cutting platform 100. Each handle assembly 220 includes a push rod 221 and a third drive device 222 connected to the push rod 221 and configured to drive the push rod 221 to move longitudinally. During operation, the third drive device 222 of the symmetrically disposed handle assemblies 220 is activated to drive the push rod 221 to move forward or backward, so as to enable the push rod 221 to clamp a front side surface and a rear side surface of the power battery module 300. Such a structure is simple and has low costs. Specifically, the third drive device 222 is a cylinder. The push rod 221 is provided with a friction pad 2211 to increase the friction force of clamping the power battery module 300, to prevent the power battery module 300 from being released in a clamping process.

Figure 3:
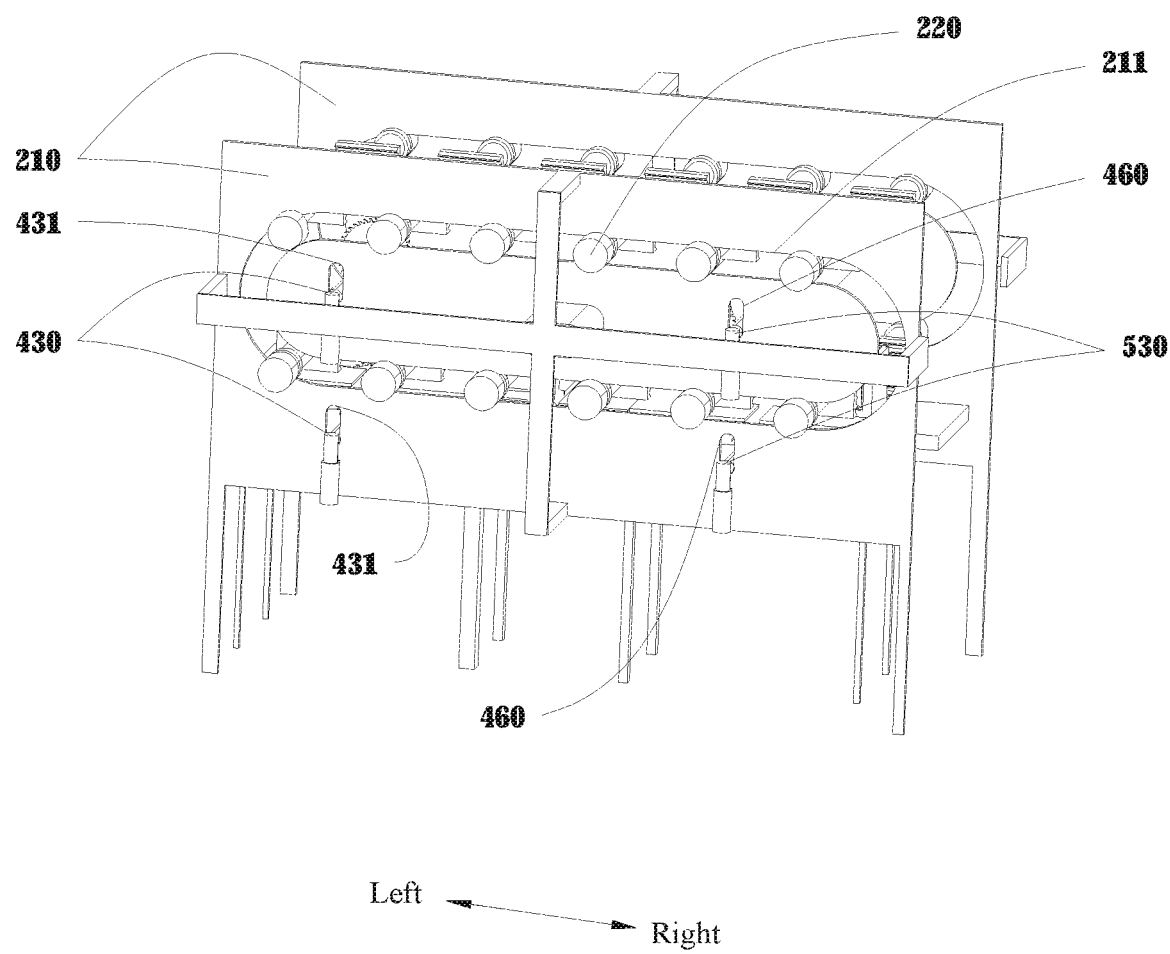
FIG. 3 is a schematic structural diagram of a cutting portion.

In a further embodiment of the present disclosure, as shown in FIG. 1, FIG. 3, and FIG. 7, each support frame 210 is provided with a guide groove 211 in the form of an annular track. The handle assembly 220 further includes a first slide block 223, a gear, and a fourth drive device. The first slide block 223 is connected to the third drive device 222 and moves along the guide groove 211. The fourth drive device is connected to the first slide block 223. The gear is mounted on the fourth drive device. The support frame 210 is provided with a rack fitting the gear. Specifically, the rack is also in the form of an annular track. The fourth drive device is a rotary cylinder or a motor. During working, the fourth drive device is activated to drive the gear to rotate. The gear fits and moves along the rack, to further drive the first slide block 223 to move along the guide groove 211. Due to the provision of the plurality of handle assemblies 220 which move on the guide groove 211, such a structure implements continuous cutting of the power battery module 300, thereby improving the cutting efficiency.

Figure 4:
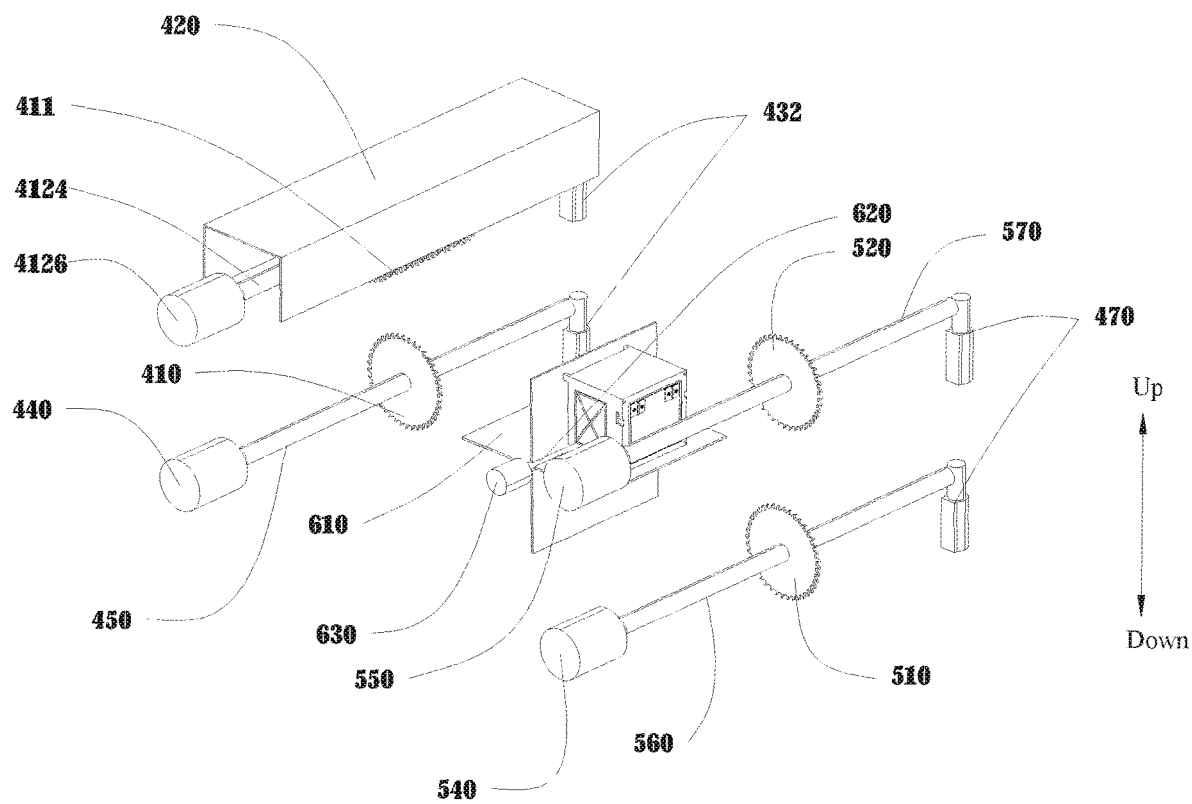
FIG. 4 is a schematic structural diagram of a first cutting mechanism and a second cutting mechanism.

In a further embodiment of the present disclosure, as shown in FIG. 3 and FIG. 4, the first cutting mechanism 400 further includes a fifth drive device 440 and a second shaft 450 connected to the fifth drive device 440. The first cutting blade 410 is mounted on the second shaft 450. The second cutting mechanism 500 further includes a sixth drive device 540, a seventh drive device 550, a third shaft 560 connected to the sixth drive device 540, and a fourth shaft 570 connected to the seventh drive device 550. The third cutting blade 510 is mounted on the third shaft 560. The fourth cutting blade 520 is mounted on the fourth shaft 570. The first drive assembly 430 includes two first grooves 431 and two first cylinders 432. The first grooves 431 are provided in the support frame 210 at positions corresponding to the first shaft 4124 and the second shaft 450, respectively. The first cylinders 432 are respectively connected to the first shaft 4124 and the second shaft 450. The second drive assembly 412 includes two second grooves 460 and two second cylinders 470. The second grooves 460 are provided in the support frame 210 at positions corresponding to the third shaft 560 and the fourth shaft 570, respectively. The second cylinders 470 are respectively connected to the third shaft 560 and the fourth shaft 570. During adjustment of heights of the cutting blades, the first cylinders 432 are activated to move the first shaft 4124 and the second shaft 450 upward or downward along the first groove 431, and the second cylinders 470 are activated to move the third shaft 560 and the fourth shaft 570 upward or downward along the second grooves 460. Each of the fifth drive device 440, the sixth drive device 540, and the seventh drive device 550 may be a motor or a rotary cylinder.

In some embodiments of the present disclosure, as shown in FIG. 4, the turnover mechanism 600 includes a plurality of turnover vanes 610, a fifth shaft 620, and an eighth drive device 630 configured to drive the fifth shaft 620 to rotate. The turnover vanes 610 are mounted on the fifth shaft 620. The fifth shaft 620 is connected to the eighth drive device 630. Specifically, the plurality of turnover vanes 610 may be arranged in such a way that two turnover vanes 610 are arranged on the fifth shaft 620 at a right angle, or three turnover vanes 610 are arranged on the fifth shaft 620 at a right angle, or four turnover vanes 610 are arranged on the fifth shaft 620 at a right angle. The eighth drive device 630 may be a motor or a rotary cylinder. As an example, there are four turnover vanes 610 arranged on the fifth shaft 620 at right angles. During operation, the power battery module 300 is located on the turnover vanes 610. The eighth drive device 630 controls the fifth shaft 620 to rotate. The fifth shaft 620 drives the turnover vanes 610 to rotate by 90°, so that the power battery module 300 is turned over. The turned over power battery module 300 continues to be clamped by the clamping mechanism 200 and delivered onto the second cutting mechanism 500.

Figure 8:
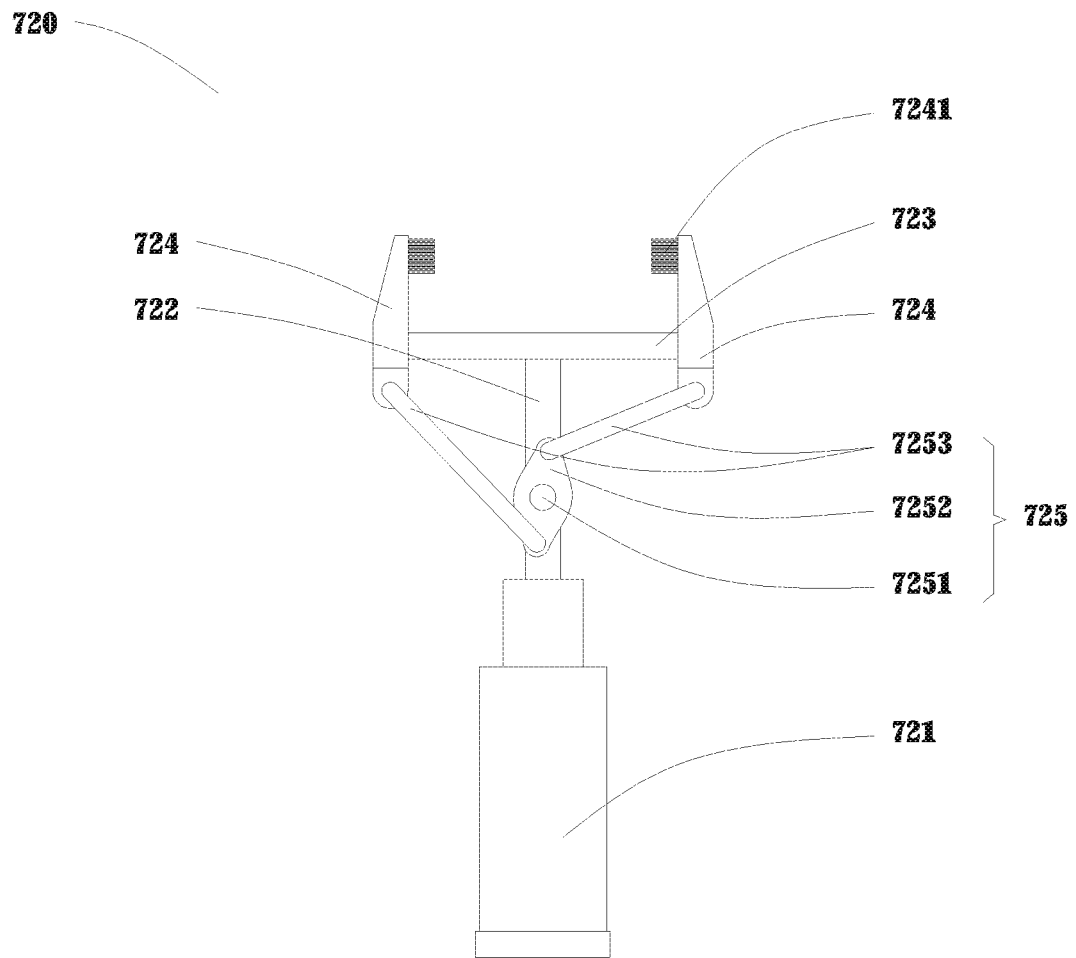
FIG. 8 is a schematic structural top view of a gripping mechanism.

In some embodiments of the present disclosure, as shown in FIG. 1 and FIG. 8, the stripping mechanism 700 includes a first conveying mechanism 710 and a plurality of gripping mechanisms 720 oppositely disposed on a front side and a rear side of the first conveying mechanism 710. Each gripping mechanism 720 includes a ninth drive device 721, a gripping rod 722, a slide rail 723, a gripping slide block 724, and a tenth drive device 725. The gripping rod 722 is connected to the ninth drive device 721. The slide rail 723 is mounted on the gripping rod 722. The gripping slide block 724 is movably disposed on the slide rail 723 and is connected to the tenth drive device 725. The ninth drive device 721 is configured to drive the gripping rod 722 to move longitudinally. The tenth drive device 725 is configured to drive the gripping slide block 724 to move along the slide rail 723. During operation, the ninth drive device 721 is activated to move the gripping rod 722 forward or backward to approach the power battery module 300. The tenth drive device 725 is then activated to cause the gripping slide block 724 to be closed to clamp the left side surface and the right side surface of the power battery module 300. Then, the ninth drive device 721 is activated to restore the gripping rod 722, so as to strip the housing. Specifically, there are two gripping slide blocks 724 which are transversely movable. The first conveying mechanism 710 is a roller conveyor belt. The ninth drive device 721 is a cylinder. The tenth drive device 725 consists of two cylinders, or a motor and a screw rod. The screw rod is connected to the gripping slide blocks 724. Each gripping slide block 724 is provided with an elastic nail 7241 inserted in the gripping slide block 724. The elastic nail 7241 may be implemented by a tension spring. During gripping, the elastic nail may be inserted when there is a hole, and retract when there is a flat surface, to adapt to the grasping and fixation of different power battery modules 300.

In a further embodiment of the present disclosure, as shown in FIG. 8, the tenth drive device 725 includes a rotary motor 7251, a rotating disk 7252, and two rotating rods 7253. The rotary motor 7251 is mounted on the gripping rod 722. The rotating disk 7252 is connected to the rotary motor 7251. The rotating rods 7253 are respectively connected to the gripping slide block 724 and the rotating disk 7252. During operation, when the rotary motor 7251 rotates counterclockwise, the rotating rod 7253 on the left moves rightward, and the rotating rod 7253 on the right moves leftward, to close the two gripping slide blocks 724. When the rotary motor 7251 rotates clockwise, the rotating rod 7253 on the left moves leftward, and the rotating rod 7253 on the right moves rightward, to move the two gripping slide blocks 724 away from each other. Such a structure is simple, and manufacturing costs are low.

Figure 9:
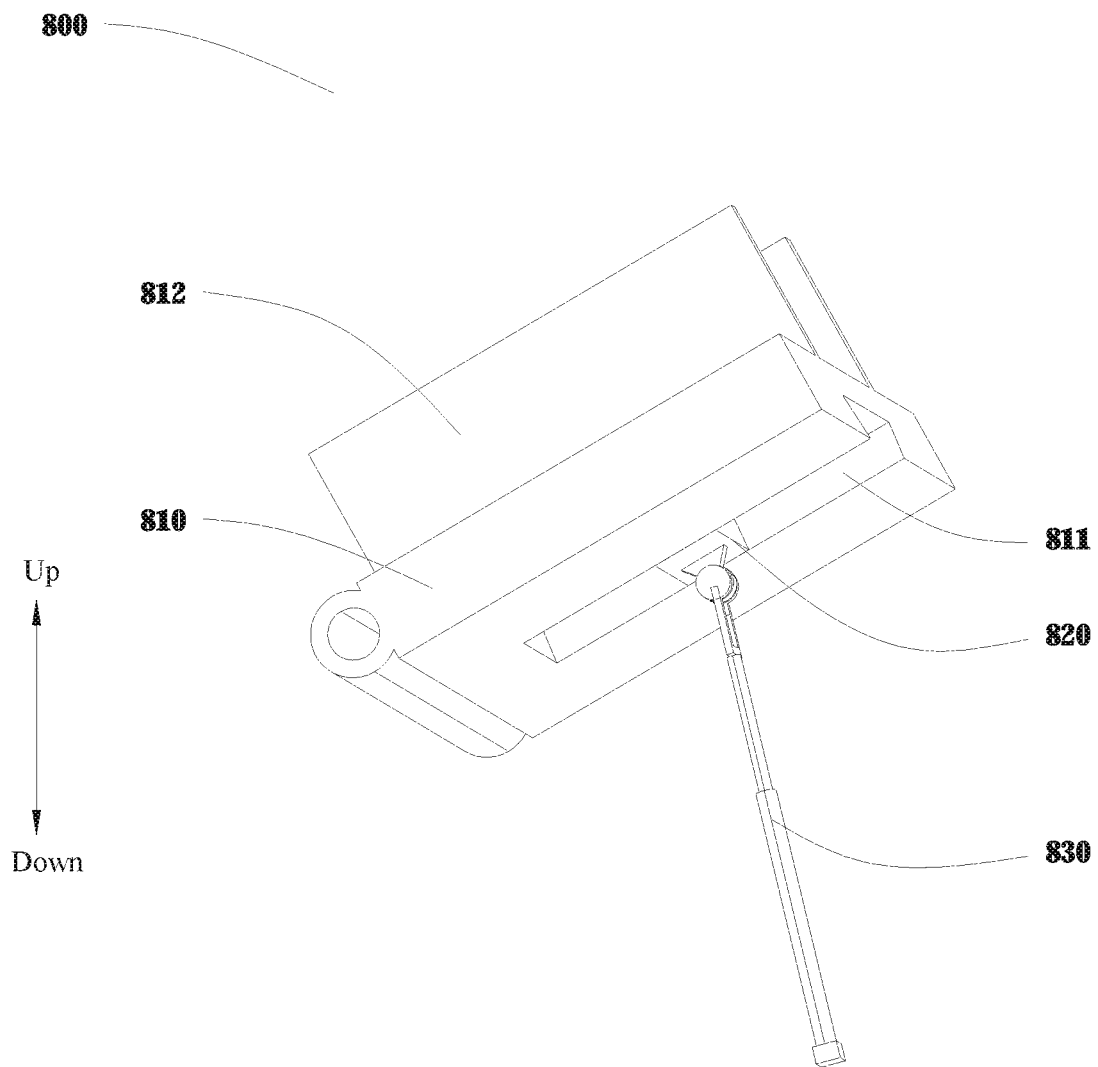
FIG. 9 is a schematic structural diagram of a position device.
Figure 10:
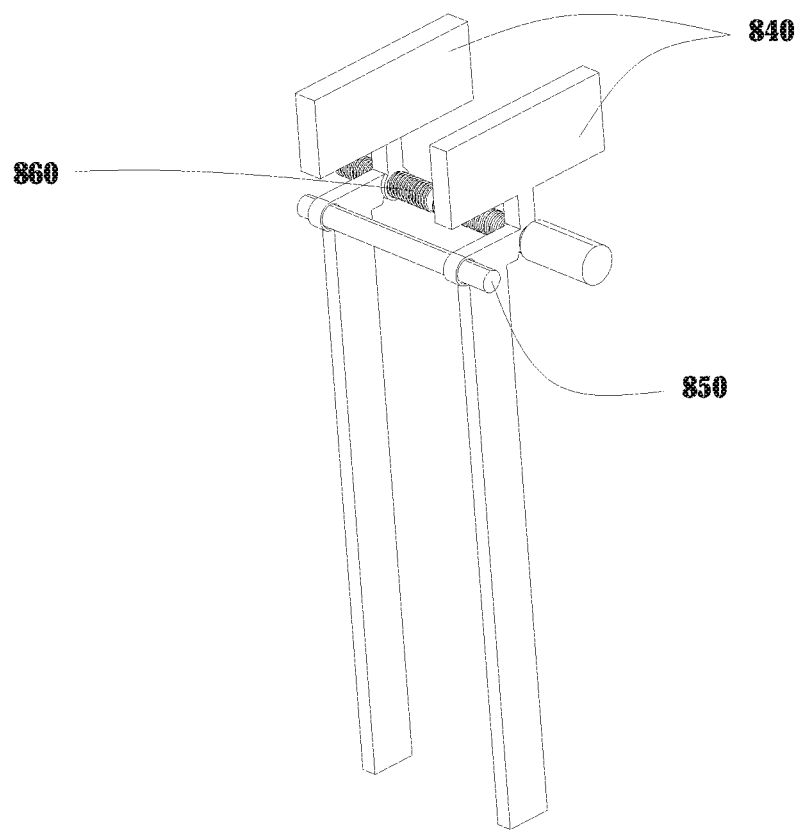
FIG. 10 is a schematic structural diagram showing fitting of a blocking baffle and a double screw.

In a further embodiment of the present disclosure, as shown in FIG. 9 and FIG. 10, the device further includes a position device 800. The position device 800 includes a reverse platform 810, a second slide block 820, and a third cylinder 830. The reverse platform 810 is hinged to an outlet end of the first conveying mechanism 710. The third cylinder 830 is hinged to the second slide block 820. A slide groove 811 matching the second slide block 820 is provided in a bottom of the reverse platform 810. The second slide block 820 is slidably connected to the slide groove 811. A correction baffle 812 is provided on an upper end surface of the reverse platform 810. The position device 800 is provided to facilitate a next procedure. During operation, because the second slide block 820 is hinged to the third cylinder 830, the third cylinder 830 pushes the second slide block 820 to move upward along the slide groove 811, which in turn causes the reverse platform 810 to turn over upward. The reverse platform 810 lifts a battery cell, and turns the battery cell back to a correct position with the help of the power provided by the roller. The third cylinder 830 is then restored. When rotated to be lower than the first conveying mechanism 710, the battery cell falls to another procedure. The position device 800 further includes two blocking baffles 840, a slide post 850, and a double screw 860. The blocking baffles 840 are respectively connected to the slide post 850 and the double screw 860. The double screw 860 is driven by the motor. During use, the motor is activated to drive the double screw 860 to rotate. The two blocking baffles 840 move along the slide post 850 and are closed or opened under the action of a left-hand thread and a right-hand thread of the double screw 860. The blocking baffles 840 are provided to prevent the battery from tilting and falling in a sliding process.

Figure 11:
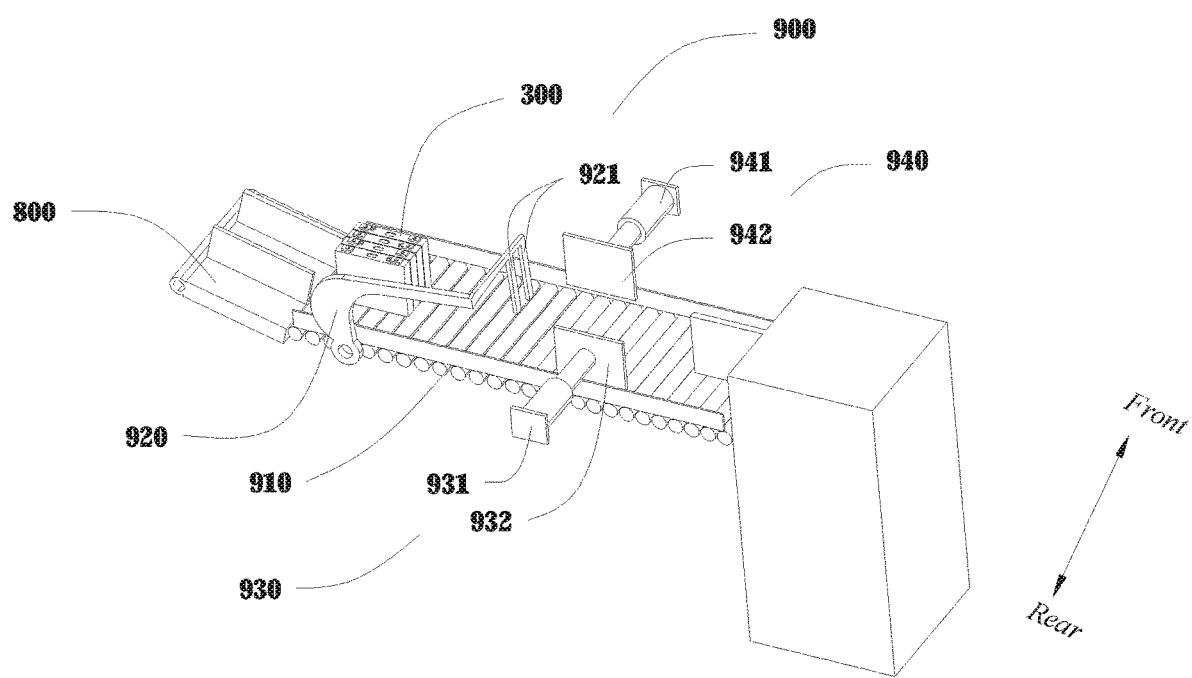
FIG. 11 is a schematic structural diagram of a sorting device.

In a further embodiment of the present disclosure, as shown in FIG. 11, the device further includes a sorting device 900. The sorting device 900 includes a second conveying mechanism 910, a sorting baffle 920, a first pushing mechanism 930, and a second pushing mechanism 940. The second conveying mechanism 910 is disposed at an outlet end of the position device 800. The sorting baffle 920 is hinged to the second conveying mechanism 910. The first pushing mechanism 930 and the second pushing mechanism 940 are disposed on the right of the sorting baffle 920 and are disposed on a front side and a rear side of the second conveying mechanism 910, respectively. The sorting baffle 920 is provided with a plurality of blocking teeth 921. The first pushing mechanism 930 is provided with a fourth cylinder 931 and a first pushing plate 932. The second pushing mechanism 940 is provided with a fifth cylinder 941 and a second pushing plate 942. Specifically, the second conveying mechanism 910 is a roller conveyor belt. The arrangement positions and number of the blocking teeth 921 can be set according to an actual number of cells of the power battery module 300 and the positions of positive electrodes and negative electrodes. For example, four battery cells are placed in a longitudinal direction in an order of a positive cell, a negative cell, a positive cell, and a negative cell. Two blocking teeth 921 are provided and are disposed at positions corresponding to two negative battery cells. The sorting baffle 920 is connected to the motor. During operation, the sorting baffle 920 is rotated down into operation manually or by the motor. The power battery module 300 passes through the position device 800 to enter the second conveying mechanism 910. The second conveying mechanism 910 drives the power battery module 300 to move. Because the blocking teeth 921 are provided, negative battery cells will be blocked by the blocking teeth 921 from moving, while positive battery cells continue to move. When it is detected that the positive battery cells are in front of the first pushing mechanism 930, the fourth cylinder 931 is activated to move the first pushing plate 932 forward. The positive battery cells are conveyed to a place for storing positive battery cells. When the positive battery cells are pushed by the second pushing plate 942, the sorting baffle 920 is rotated up manually or by the motor to allow the negative battery cell to move. When it is detected that the negative battery cells are in front of the second pushing mechanism 940, the fifth cylinder 941 is activated to move the second pushing plate 942 backward, and the negative battery cells are conveyed to a place for storing negative battery cells. By providing the sorting device 900 for sorted storage, potential safety hazards that a short circuit occurs between battery cells during storage and transport is prevented.

In the description of the specification, the description with reference to terms "some embodiments", "it can be conceived of", and the like indicate that specific features, structures, materials or characteristics described with reference to the embodiments or examples are included in at least one embodiment or example of the present disclosure. In the specification, the schematic descriptions of the foregoing terms do not necessarily involve the same embodiments or examples. In addition, the described specific features, structures, materials or characteristics may be combined in an appropriate manner in any one or more embodiments or examples.

Although the embodiments of the present disclosure have been shown and described above, those having ordinary skill in the art may understand that various changes, modifications, replacements, and variations may be made to these embodiments within the principle and concept of the present disclosure, and the scope of the present disclosure is as defined by the appended claims and equivalents thereof.

The invention claimed is:

1. A device for automatically dismantling a power battery module, comprising:
  a cutting platform;
  a clamping mechanism, configured to clamp two sides of a power battery module to move the power battery module on the cutting platform;
  a first cutting mechanism, disposed on the cutting platform, and comprising a first cutting blade, a cutting blade set, and a first drive assembly, wherein the cutting blade set and the first cutting blade are disposed vertically at an interval, the cutting blade set comprises a plurality of second cutting blades movable relative to each other and a second drive assembly configured to drive the second cutting blades to move and rotate, and the first drive assembly is configured to drive the first cutting blade and the second cutting blades to move vertically; wherein, the second drive assembly comprises a plurality of connecting frames hinged to each other, a plurality of bearings, a plurality of mounting bases, a first shaft, a first drive device, and a second drive device, the connecting frames comprise a plurality of connecting rods hinged to each other in the middle, each connecting rod is connected to a toggle stand, each bearing is mounted on the toggle stand, each mounting base is mounted on the bearing, each second cutting blade is mounted on the mounting base, the mounting base is provided with a through hole matching the first shaft in shape, the first shaft is slidably connected to the through hole, the second drive device drives the first shaft to rotate to enable the first shaft to drive the mounting bases to rotate, and the first drive device is connected to the connecting frames;
  a second cutting mechanism, disposed on the cutting platform, and comprising a third cutting blade, a fourth cutting blade, and a third drive assembly, wherein the fourth cutting blade and the third cutting blade are disposed vertically at an interval, and the third drive assembly is configured to drive the third cutting blade and the fourth cutting blade to move vertically;

a turnover mechanism, disposed between the first cutting mechanism and the second cutting mechanism, and configured to horizontally turn over the power battery module; and a stripping mechanism, disposed at an outlet end of the cutting platform, and configured to strip a housing of the power battery module.

2. The device for automatically dismantling the power battery module of claim 1, wherein the clamping mechanism comprises support frames disposed on a front side and a rear side of the cutting platform and a plurality of handle assemblies movably disposed on the support frames, and oppositely arranged on the front side and the rear side of the cutting platform; and each handle assembly comprises a push rod, and a third drive device connected to the push rod and configured to drive the push rod to move longitudinally.

3. The device for automatically dismantling the power battery module of claim 2, wherein each support frame is provided with a guide groove in the form of an annular track, the handle assembly further comprises a first slide block, a gear, and a fourth drive device, the first slide block is connected to the third drive device and moves along the guide groove; and the fourth drive device is connected to the first slide block, the gear is mounted on the fourth drive device, and the support frame is provided with a rack fitting the gear.

4. The device for automatically dismantling the power battery module of claim 2, wherein the first cutting mechanism further comprises a fifth drive device and a second shaft connected to the fifth drive device, and the first cutting blade is mounted on the second shaft; the second cutting mechanism further comprises a sixth drive device, a seventh drive device, a third shaft connected to the sixth drive device, and a fourth shaft connected to the seventh drive device, the third cutting blade is mounted on the third shaft, and the fourth cutting blade is mounted on the fourth shaft; and the first drive assembly comprises two first grooves and two first cylinders, the first grooves are provided in the support frame at positions corresponding to the first shaft and the second shaft respectively, the first cylinders are respectively connected to the first shaft and the second shaft, the second drive assembly comprises two second grooves and two second cylinders, the second grooves are provided in the support frame at positions corresponding to the third shaft and the fourth shaft respectively, and the second cylinders are respectively connected to the third shaft and the fourth shaft.

5. The device for automatically dismantling the power battery module of claim 1, wherein the stripping mechanism comprises a first conveying mechanism and a plurality of gripping mechanisms oppositely disposed on a front side and a rear side of the first conveying mechanism; each gripping mechanism comprises a ninth drive device, a gripping rod, a slide rail, a gripping slide block, and a tenth drive device, the gripping rod is connected to the ninth drive device, the slide rail is mounted on the gripping rod, the gripping slide block is movably disposed on the slide rail, and the gripping slide block is connected to the tenth drive device; and the ninth drive device is configured to drive the gripping rod to move longitudinally, and the tenth drive device is configured to drive the gripping slide block to move along the slide rail.

6. The device for automatically dismantling the power battery module of claim 5, wherein the tenth drive device comprises a rotary motor, a rotating disk, and two rotating rods, the rotary motor is mounted on the gripping rod, the rotating disk is connected to the rotary motor, and the rotating rods are respectively connected to the gripping slide block and the rotating disk.

7. The device for automatically dismantling the power battery module of claim 5, further comprising a position device, wherein the position device comprises a reverse platform, a second slide block, and a third cylinder, the reverse platform is hinged to an outlet end of the first conveying mechanism, the third cylinder is hinged to the second slide block, a slide groove matching the second slide block is provided in a bottom of the reverse platform, the second slide block is slidably connected to the slide groove, and a correction baffle is provided on an upper end surface of the reverse platform.

8. The device for automatically dismantling the power battery module of claim 7, further comprising a sorting device wherein the sorting device comprises a second conveying mechanism, a sorting baffle, a first pushing mechanism, and a second pushing mechanism, the second conveying mechanism is disposed at an outlet end of the position device, the sorting baffle is hinged to the second conveying mechanism, the first pushing mechanism and the second pushing mechanism are disposed on the right of the sorting baffle, and the first pushing mechanism and the second pushing mechanism are respectively disposed on a front side and a rear side of the second conveying mechanism; and the sorting baffle is provided with a plurality of blocking teeth, the first pushing mechanism is provided with a fourth cylinder and a first pushing plate, and the second pushing mechanism is provided with a fifth cylinder and a second pushing plate.

* * * * *